(12) United States Patent
Kim et al.

(10) Patent No.: US 10,947,760 B2
(45) Date of Patent: Mar. 16, 2021

(54) HINGE FOR A FOLDING WINDSHIELD

(71) Applicant: Vialink Corp, Fuquay Varina, NC (US)

(72) Inventors: Charles Dunn Kim, Cary, NC (US); David Blum, Fuquay Varina, NC (US)

(73) Assignee: NIVEL PARTS & MANUFACTURING CO., LLC, Jacksonville, FL (US)

( * ) Notice: Subject to any disclaimer, the term of this patent is extended or adjusted under 35 U.S.C. 154(b) by 91 days.

(21) Appl. No.: 16/405,238

(22) Filed: May 7, 2019

(65) Prior Publication Data

US 2019/0338573 A1 Nov. 7, 2019

Related U.S. Application Data

(60) Provisional application No. 62/667,915, filed on May 7, 2018.

(51) Int. Cl.
*E05D 5/02* (2006.01)
*E05D 1/04* (2006.01)
*B60J 1/06* (2006.01)

(52) U.S. Cl.
CPC .............. *E05D 5/0246* (2013.01); *B60J 1/06* (2013.01); *E05D 1/04* (2013.01); *E05D 2700/04* (2013.01)

(58) Field of Classification Search
None
See application file for complete search history.

(56) References Cited

U.S. PATENT DOCUMENTS

| 7,311,347 | B1 * | 12/2007 | Aller | A63B 55/61 |
| | | | | 296/77.1 |
| 2009/0278373 | A1 * | 11/2009 | Rouzer | B60J 1/06 |
| | | | | 296/92 |
| 2011/0001331 | A1 * | 1/2011 | Hirneise | B60J 1/06 |
| | | | | 296/87 |
| 2015/0043051 | A1 * | 2/2015 | Woodrow | G02F 1/0126 |
| | | | | 359/241 |
| 2019/0030999 | A1 * | 1/2019 | Woodrow | B60J 1/06 |

* cited by examiner

*Primary Examiner* — Lori L Lyjak
(74) *Attorney, Agent, or Firm* — Coats & Bennett, PLLC

(57) ABSTRACT

A hinge for a folding windshield is provided for vehicles such as all-terrain vehicles (ATVs) utility vehicles (UTVs), golf carts, and other vehicles. The hinge includes an integral stiffening member or brace to prevent the windshield from bowing due to wind pressure and vibration.

10 Claims, 6 Drawing Sheets

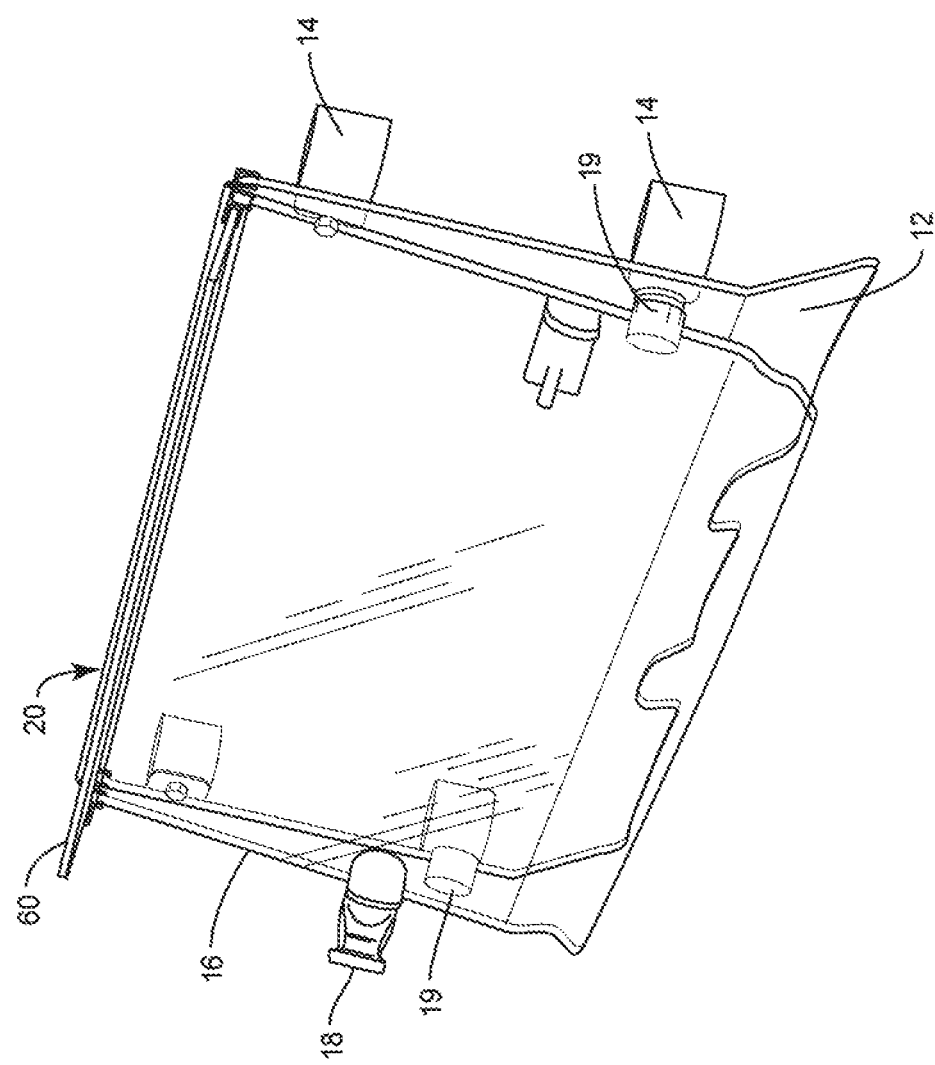
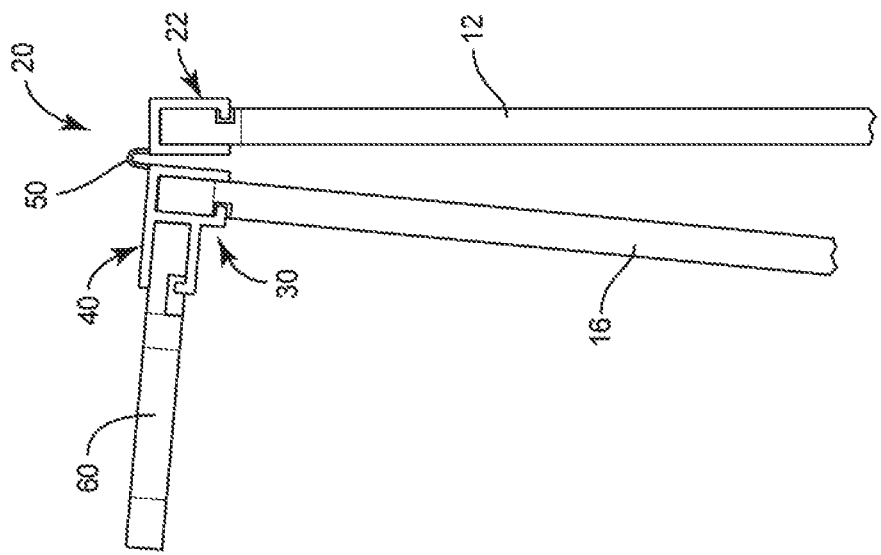
FIG. 4A
FIG. 4B

HINGE FOR A FOLDING WINDSHIELD

TECHNICAL FIELD

The present disclosure relates generally to folding windshields for utility vehicles, all-terrain vehicles, golf carts and other vehicles and, more particularly, to a hinge for a folding windshield designed to reduce bowing of the windshield due to wind pressure when the vehicle is moving.

BACKGROUND

Utility vehicles (UTVs), all-terrain vehicles (ATVs), and golf carts often include a windshield attached to a support frame over the passenger compartment of the vehicle. The windshield provides protection to the passengers in the vehicle when the vehicle is moving forward. In some cases, the frame supports a roof that provides partial protection for the passengers against wind and precipitation, as well as providing shade in warm seasons or warm climates. In this case, the windshield provides additional protection against wind, debris and precipitation.

One type of windshield that is commonly used is a folding windshield having an upper pane that folds down against a lower pane. In this type of windshield, the upper pane and lower pane are joined by a hinge such as an extruded from PVC, piano hinge, butt hinge, or the like. In the case of the PVC hinge, the material lacks sufficient strength so that wind pressure or vibration may cause the windshield to bow in inwardly when the vehicle is moving forward.

SUMMARY

The present disclosure relates generally to folding windshields for utility vehicles, all-terrain vehicles, golf carts and similar vehicles. The folding windshield comprises a lower pane and an upper pane that are rotatably connected by an elongated hinge assembly. The hinge assembly includes an integral stiffening member or brace to prevent the windshield from bowing inward due to wind pressure when the vehicle is moving.

BRIEF DESCRIPTION OF THE DRAWINGS

FIG. 4A is a perspective view of the folding windshield in a folded position.

FIG. 4B is a perspective view of the folding windshield in an unfolded position.

DETAILED DESCRIPTION

Figure 1A:
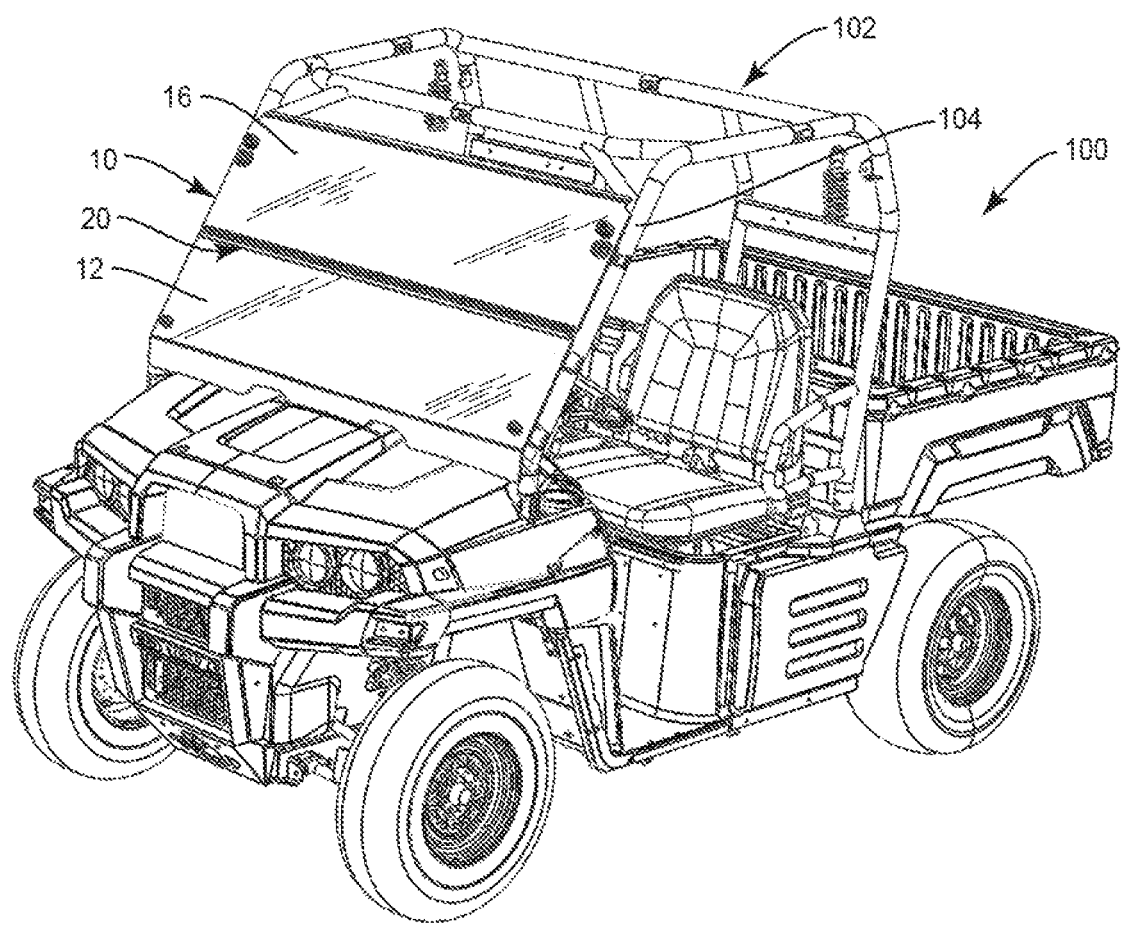
FIG. 1A is a perspective view of a folding windshield in an unfolded position installed to a utility vehicle.

Referring now to the drawings, FIG. 1 illustrates a folding windshield 10 installed on a UTV 100. FIGS. 2A and 2B are exploded views of the folding windshield 10. The folding windshield 10 generally comprises a lower pane 12 and an upper pane 16 joined together by an elongated hinge assembly 20. The lower pane 12 and upper pane 16 are made from a sheet of transparent sheet material such as acrylic, polycarbonate, glass or similar material. The hinge assembly 20 is co-molded and extruded from a thermoplastic materials such as polyvinyl chloride (PVC) as described in more detail below.

The windshield 10 is configured to mount to the support posts 104 of a frame 102 of the UTV 100 designed, for example, to support the roof (not shown) of the UTV 100. The lower pane 12 of the folding windshield is attached to the support posts 104 of the frame 102 by brackets 14. The upper pane 16 includes a latch 18 configured to that engages the vertical posts 104 of the frame 102. The design of the mounting hardware including the bracket 14 and latch 18 is not material to the present disclosure but is shown for completeness.

Figure 1B:
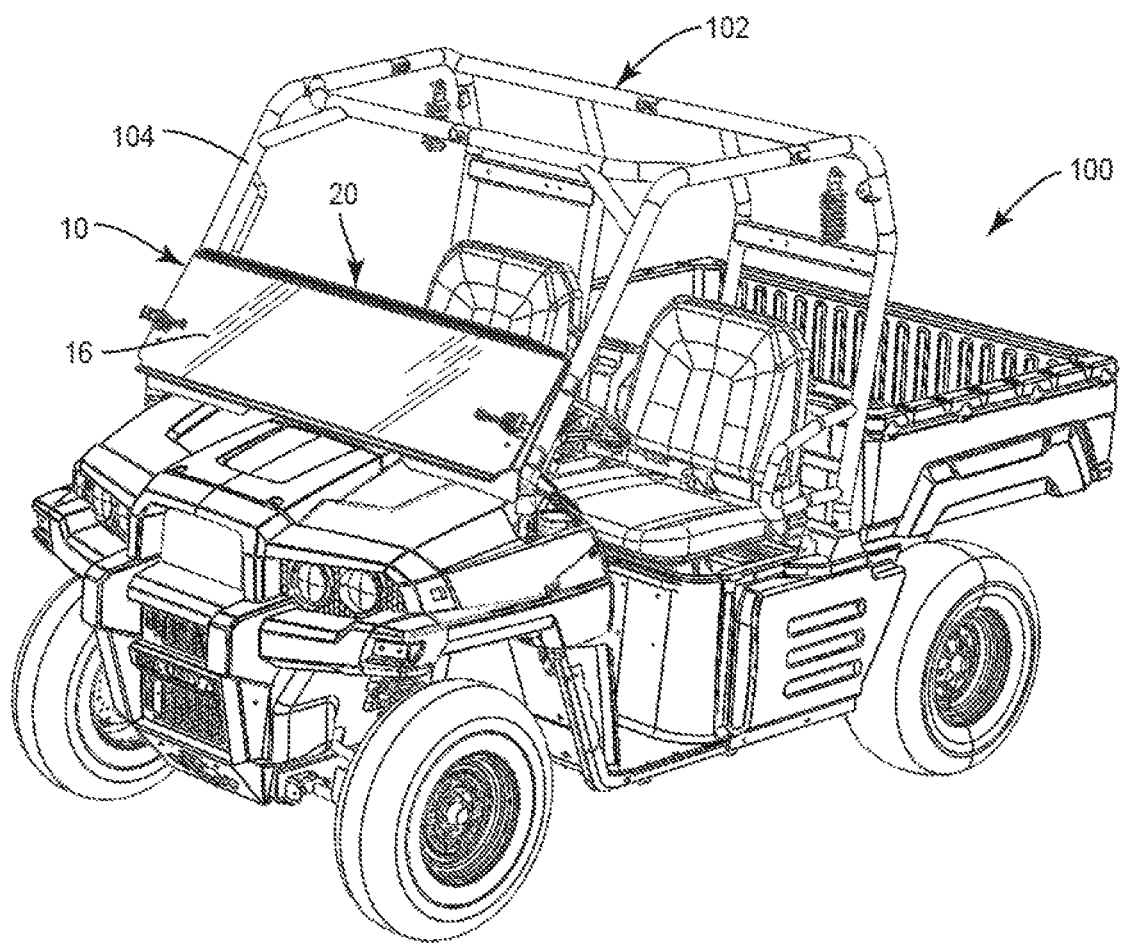
FIG. 1B is a perspective view of a folding windshield in a folded position installed to a utility vehicle.
Figure 2B:
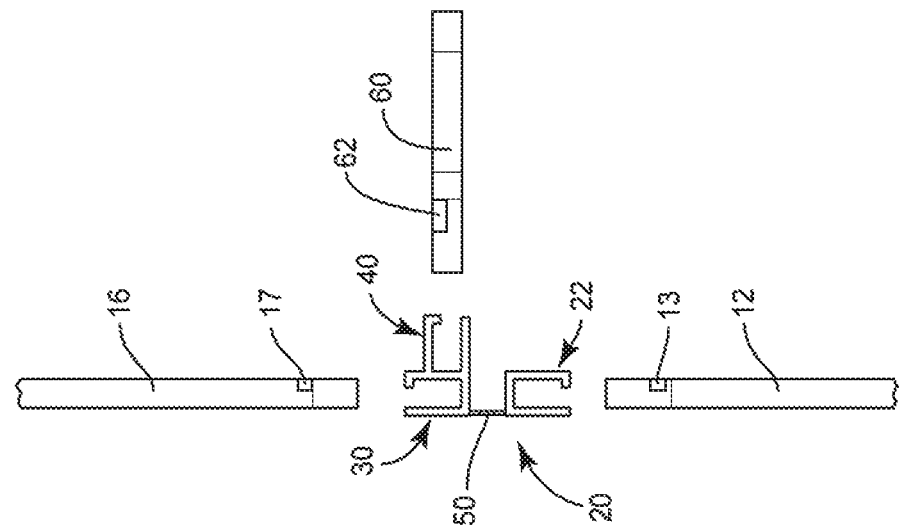
FIG. 2B is an exploded section view showing the hinge of the folding windshield.
Figure 2A:
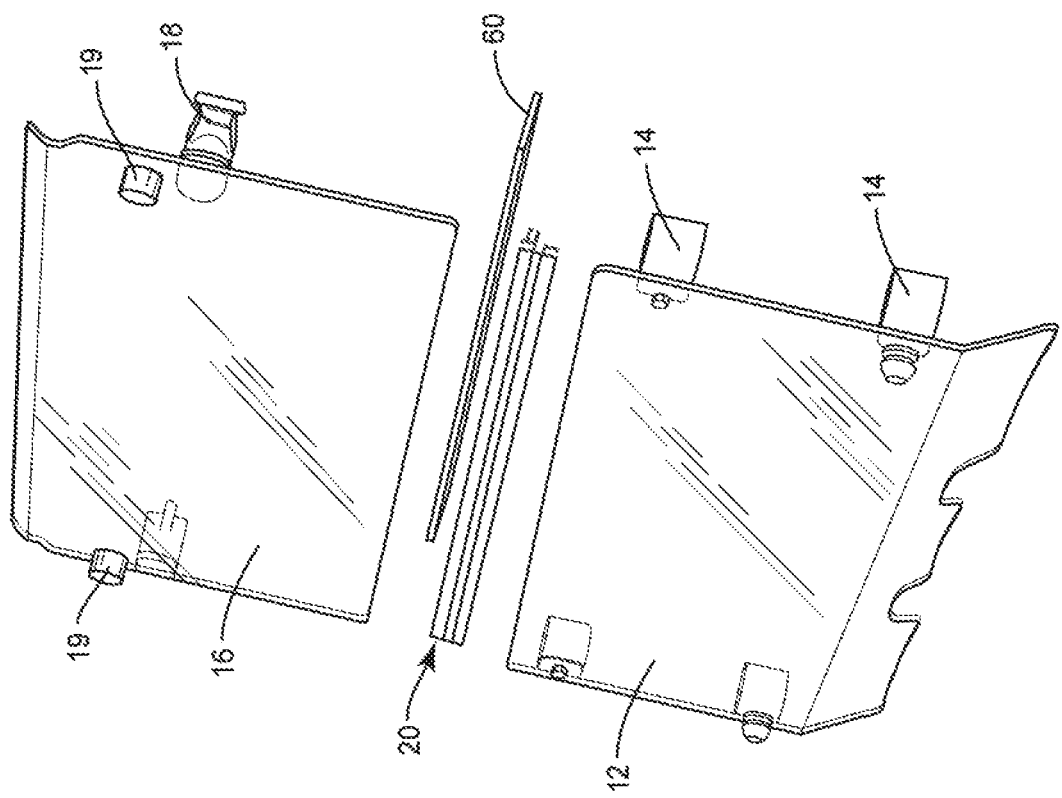
FIG. 2A is an exploded perspective view of the folding windshield.
Figure 3B:
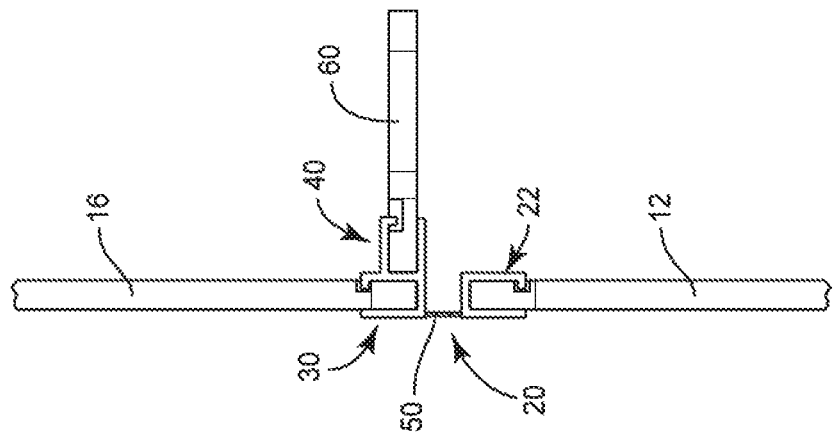
FIG. 3B is an exploded section view showing the hinge of the folding windshield in s unfolded position.
Figure 3A:
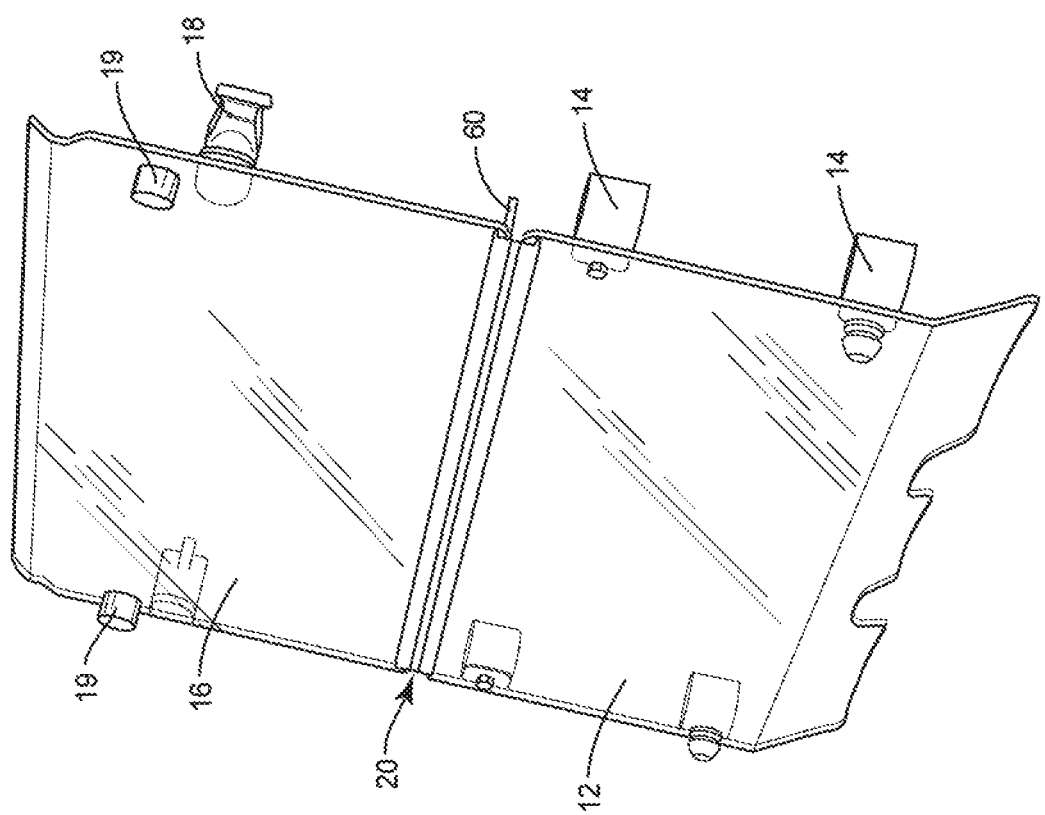
FIG. 3A is perspective view of the folding windshield in an unfolded position.

The hinge assembly 20 allows the upper pane 16 of the windshield 10 to rotate between an unfolded position as shown in FIGS. 1A, 3A and 3B to a folded position as shown in FIGS. 1B, 4A and 4B. In the unfolded position, the latch 18 is rotated to engage the supports posts 104 of the frame 102 to hold the upper pane 16 in the unfolded position. When the latch 18 is disengaged from the support posts 104 of the frame 102, the upper pane 16 is able to fold down against or towards the lower pane 12.

Figure 6:
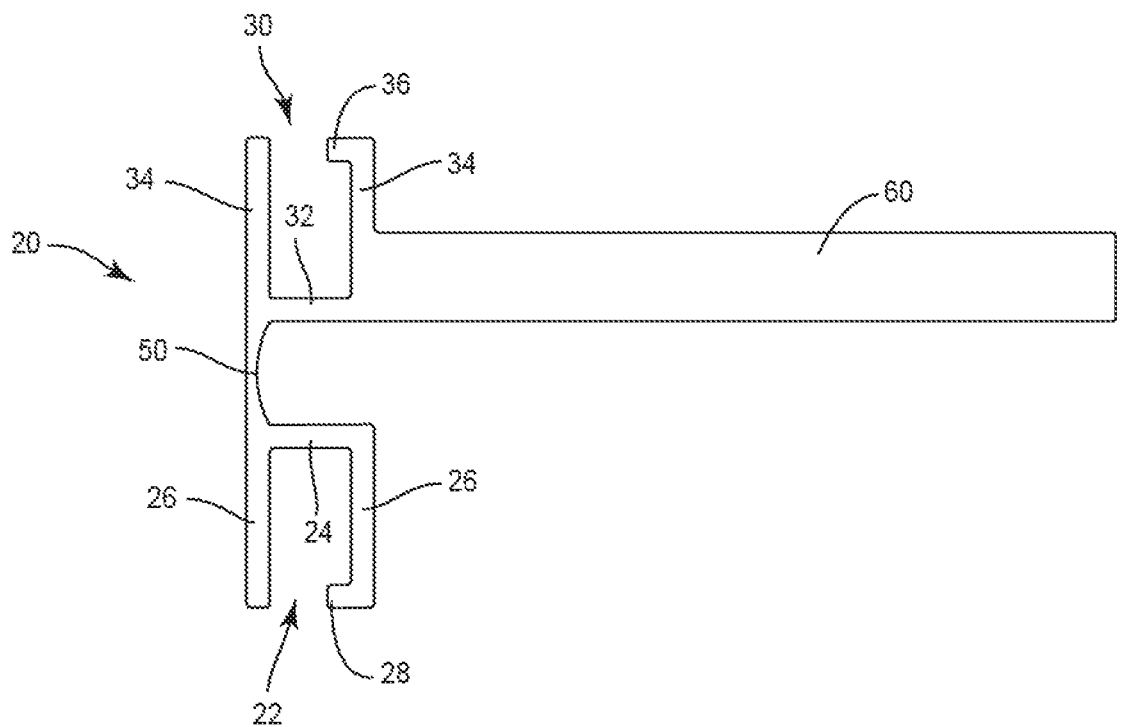
FIG. 6 is a cross section of an alternate design of a hinge assembly for a folding windshield.

The brace 60 extends along at least a portion of the length of the hinge assembly 20 to reduce deflection or bowing of the folding windshield 10. In one embodiment, the brace 60 is removably attached to the hinge assembly 20 and can be made from the same material as the lower pane 12 and upper pane 16 of the windshield 10. In another embodiment, the brace 60 is molded together with the hinge assembly 20 as a unitary piece as shown in FIG. 6.

Figure 5:
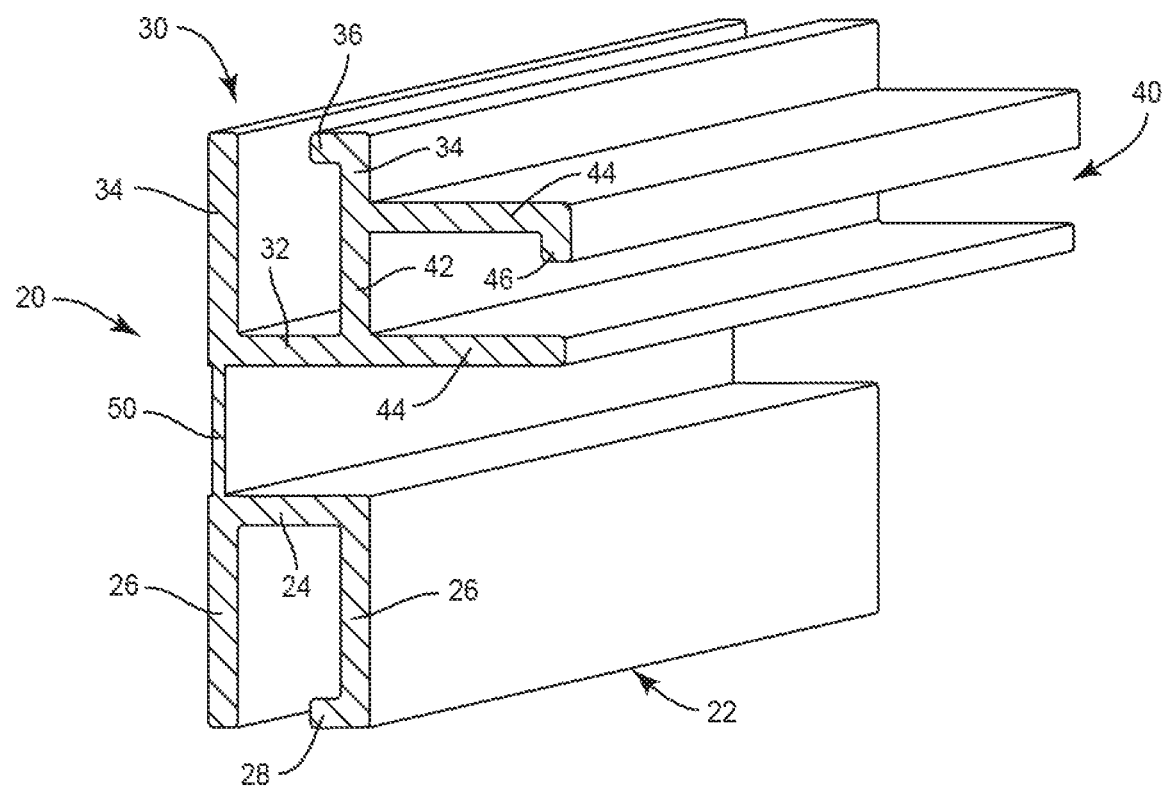
FIG. 5 is a cross-section of a hinge assembly for the folding windshield.

FIG. 5 is a cross-section of the hinge assembly according to a first embodiment. The hinge assembly 20 generally comprises a lower channel configured to receive the lower pane 12 of the folding windshield 10, an upper channel 30 configure to receive the upper pane 16 of the folding windshield, a side channel configured to receive the brace 60, and a live hinge 50 connecting the lower channel 22 and the upper channel 30.

The lower channel 22 has a generally u-shaped configuration including a web 24 and sidewalls 26. The sidewall 26 on the interior side of the hinge assembly 20 includes a protrusion 28 that is configured to engage a groove 13 in the lower pane 12 of the folding windshield 10. Similarly, the upper channel 30 has a generally u-shaped configuration including a web 32 and sidewalls 34. The sidewall 34 on the interior side of the hinge assembly 20 includes a protrusion 36 that is configured to engage a groove 17 in the upper pane 16 of the folding windshield 10. The sidewalls 26, 34 of the lower channel 22 and upper channel 30 respectively flex to allow the lower pane 12 and upper pane 16 of the folding windshield 10 to snap into the hinge assembly 20. Thus, the lower pane 12 and/or upper pane 16 can be easily replaced in the event that the lower pane 12 and/or upper pane 16 is damaged or needs replacement.

The side channel 40 extends inwardly (i.e., towards the interior of the vehicle) from the upper channel 30. Those skilled in the art will appreciate however, that the side channel 40 could alternatively extend from the lower channel 22. The side channel 40 comprises a web 42, which is a part of the interior sidewall 34 of the upper channel 30, and two sidewalls 44. A protrusion 46 extends from the end of the upper sidewall 44 and is configured to engage a groove 62 in the brace 60. The sidewalls 44 of the side channel 40 flex to allow the brace 60 of the folding windshield 10 to snap into the hinge assembly 20. Thus, the brace 60 can be easily replaced in the event that the brace 60 is damaged or needs replacement.

The lower channel 22 and upper channel 30 are joined by a live hinge 50. The live hinge 50 flexes to allow the upper pane 16 to rotate downward against the lower pane 12. The upper pane 16 may include bumpers 19 to allow for some spacing between the lower pane 12 and upper pane 16 in the folded position. The live hinge 50 is co-molded with the more rigid material of the lower channel 22 an upper channel 30 during the extrusion process so that the entire hinge assembly comprises a unitary piece.

FIG. 6 illustrates an alternative embodiment of the hinge assembly 20 where the brace 60 is extruded with the hinge assembly 20 as a unitary piece. For convenience similar reference numbers are used in FIGS. 5 and 6 to indicate similar components. In the hinge assembly 20 shown in FIG. 6, the side channel 40 is replaced by an integrally molded brace 60 that extends inward from the upper channel 30. Those skilled in the art will appreciate however, that the brace 60 could alternatively extend from the lower channel 22.

The hinge assembly 20 for the folding windshield 10 as herein described allows clean, simple installation of a stiffening brace 60 to keep windshield from bowing in from air pressure of moving vehicle and vibration during riding. The hinge assembly 20 as herein described can be used in place of separate bolt on braces, or braces bent into the upper and lower windshield with a separate metal piano hinge bolted in between

What is claimed is:

1. A hinge assembly for a folding windshield comprising:
   an upper channel configured to removably engage a lower edge of an upper windshield;
   a lower channel configured to removably engage an upper edge of a lower windshield;
   a live hinge connected between the upper channel and lower channel so as to enable the upper windshield to fold downward against the lower windshield; and
   an elongated brace extending rearward from the upper channel or the lower channel to reduce deflection of the hinge when the windshield is installed on a moving vehicle.

2. The hinge assembly according to claim 1 wherein the upper channel, the lower channel and live hinge are formed as a unitary member.

3. The hinge assembly according to claim 1 further comprising a brace channel extending rearward from an inner wall of the upper channel or the lower channel and configured to removably engage the brace.

4. The hinge assembly according to claim 1 wherein the brace is integrally formed as a unitary part with either the upper channel or the lower channel.

5. The hinge assembly according to claim 3 wherein the upper channel, the lower channel live hinge and brace are formed as a unitary member.

6. A folding windshield for a vehicle, the folding windshield comprising:
   a lower pane configured to be mounted to a vehicle;
   an upper pane; and
   a hinge assembly rotatably connecting the upper pane to the lower pane, the hinge assembly comprising:
   an upper channel configured to removably engage a lower edge of an upper windshield;
   a lower channel configured to removably engage an upper edge of a lower windshield;
   a live hinge connected between the upper channel and lower channel so as to enable the upper windshield to fold downward against the lower windshield; and
   an elongated brace extending rearward from the upper channel or the lower channel to prevent deflection of the windshield due when the vehicle is moving.

7. The folding windshield according to claim 6 wherein the upper channel, the lower channel and live hinge are formed as a unitary member.

8. The folding windshield according to claim 6 further comprising a brace channel extending rearward from an inner wall of the upper channel or the lower channel and configured to removably engage the brace.

9. The folding windshield according to claim 6 wherein the brace is integrally formed as a unitary part with either the upper channel or the lower channel.

10. The folding windshield according to claim 9 wherein the upper channel, the lower channel live hinge and brace are formed as a unitary member.

* * * * *